Figure 1:
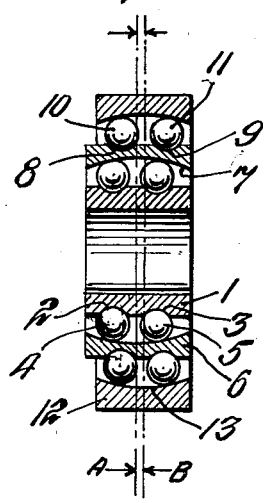

Feb. 4, 1958 — A. TEUFEL — 2,822,225

BALL BEARING ASSEMBLY

Filed May 18, 1955

United States Patent Office 2,822,225
Patented Feb. 4, 1958

2,822,225

BALL BEARING ASSEMBLY

Aloisius Teufel, Bourbon, Ind., assignor of one-half to F. I. Saemann, Warsaw, Ind.

Application May 18, 1955, Serial No. 509,171

7 Claims. (Cl. 308—183)

The present invention relates to a ball bearing assembly and more particularly to an automatically balancing ball bearing assembly for high speed rotary bodies.

High speed rotary bodies, e. g. rotors, gyroscopes, etc., of necessity require precision machining and/or supplemental balancing, e. g. by distribution of mass to maintain the center of mass in the rotational axis to preclude vibration thereof. An unbalanced rotary body produces vibration due to the shifting of the mass center from the rotational axis. Vibration produced by unbalanced rotary bodies induces uneven and noisy running, causes excessive wear of the shaft bearings, loosens connecting linkage and fixation of machine components employed in conjunction with the rotating bodies, deleteriously affects the efficiency of a machine, and otherwise shortens the life expectancy of a machine.

Heretofore, self-aligning ball bearings as such have been employed to effect a smoother running of machine shafts and the like. While such self-aligning ball bearings act to diminish certain frictional components characteristic of unbalanced rotary bodies, they also tend to restrain the shaft of an unbalanced rotor to rotate, at least during part of its revolution, about an axis other than that coinciding with its mass center, whereby the centrifugal forces so effected cause vibrations. Consequently, self-aligning ball bearings do not solve the vibration problem especially critical in high speed rotors and gyroscopes.

Static and dynamic unbalance of a rotor cause centrifugal forces to act radially of the rotational axis, whereupon the vibration thereby introduced is communicated to the shaft bearings and the shaft or rotor housing. Conventional self-aligning and self-centering ball bearings are not structurally capable of elminating the transmission of vibration of a rotary body to machine components incorporating the rotary body.

Figure 2:
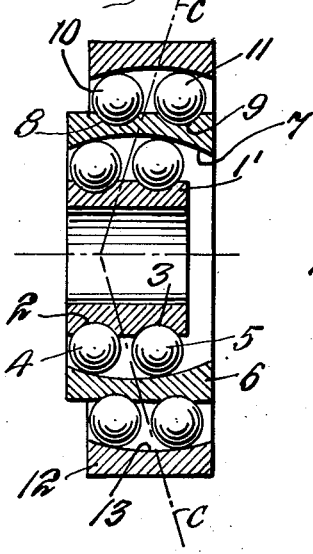
Figure 3:
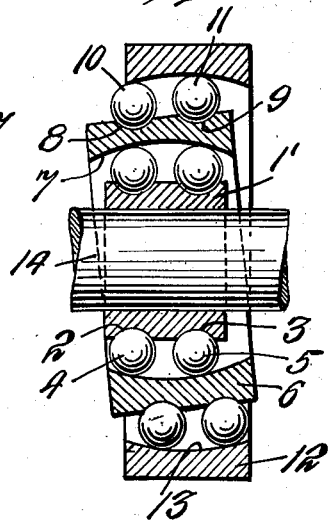
Figure 4:
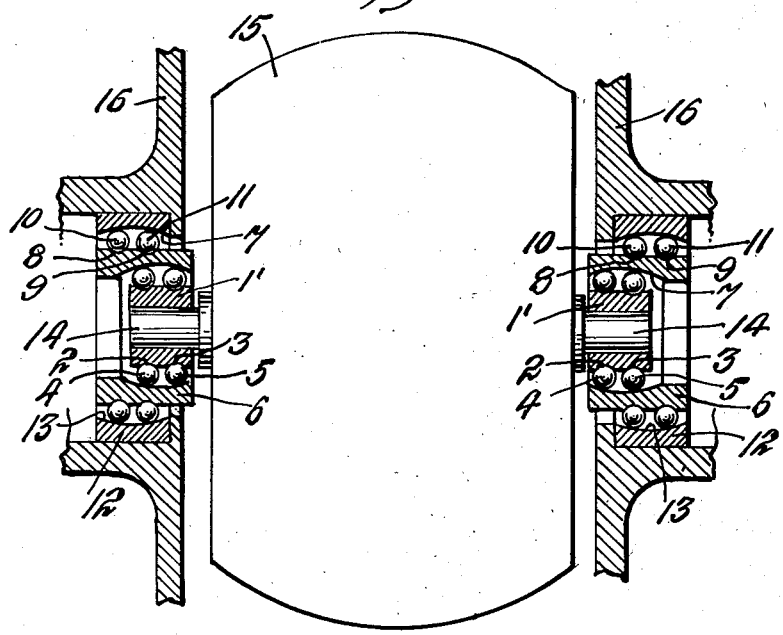

It is an object of this invention to provide an automatically balancing ball bearing assembly. It is another object of the present invention to provide a self-balancing ball bearing assembly for high speed rotary bodies and which is capable of counteracting the shift of mass center from the rotational axis of said rotary body. It is a further object of the present invention to provide an automatically balancing ball bearing assembly adapted to readily shift the rotational axis of a rotary body to coincide with the mass center thereof during revolution. It is a still further object of the present invention to provide a ball bearing assembly composed of cooperating embodiments constructed to counter balance each other and preclude the transmission of vibration of a rotary body to a machine shaft or housing. It is a still further object of the present invention to provide a ball bearing assembly for a rotary body and whereby the said rotary body is substantially free of restraint by said ball bearing assembly. Other objects and advantages of the present invention will become apparent from the description hereinafter following and the drawings forming a part hereof, in which:

Figure 1 is a partly cross-sectional and partly schematic view of a ball bearing assembly according to this invention, Figure 2 is a slightly enlarged partly cross-sectional and partly schematic view of a ball bearing assembly including a modification of Figure 1, Figure 3 is a partly cross-sectional and partly schematic view of the ball bearing assembly showing movement positions of the component parts, and Figure 4 is a partly cross-sectional and partly schematic view of a mounted ball bearing assembly according to this invention.

The ball bearing assembly according to the present invention comprises a combination of inner and outer annular series of balls co-axial or concentric with the axis of a rotating shaft and arranged with respect to a ball bearing ring between the inner and outer series in a manner such that when the intermediate ring is motivated it oscillates in accordance with the static and dynamic unbalance of a rotating body on said shaft to maintain the rotational axis of the rotating body in coincidence with the mass center thereof and substantially free of restraint thereof by the ball bearing assembly, whereby the transmission of vibration due to the unbalance of the rotating body is substantially prevented.

Figures 1 and 2 illustrate the basic aspect of the present invention which comprises a ball bearing assembly having a substantially cylindrical inner bearing mount or ring 1 provided with a pair of annular grooves or raceways 2 and 3 in its outer periphery. Ring 1' of Figure 2 is modified with respect to ring 1 of Figure 1 in that it is narrower than the said ring 1. The raceways 2 and 3 as well as the inner ball rows 4 and 5 positioned therein for revolution about the ring 1 or ring 1' are spaced with respect to each other axially of the ring 1 or ring 1'. An intermediate ball bearing ring 6 is positioned co-axially or concentrically, for example over the ring 1, and spaced therefrom with the ball rows 4 and 5 in engagement with the said raceways and with the inner surface 7 of the intermediate ring, said inner surface being a concave surface and preferably an annular spherical surface permitting the ball rows to travel transversely thereof as well as annularly thereof. The outer surface of the intermediate ring 6 is provided with a pair of annular raceways 8 and 9 in its outer periphery. The raceways 8 and 9 as well as the outer ball rows 10 and 11, positioned therein for rotation about the ring 6, are spaced with respect ot each other axially of the rings 1 and 6. An outer ball bearing ring 12 is positioned concentrically or co-axially over the ring 6 and spaced therefrom with the ball rows 10 and 11 in engagement with the said raceways 8 and 9 and with the inner surface 13 of the outer ring, said inner surface being a concave surface and preferably an annular spherical surface permitting the ball rows 10 and 11 to travel transversely thereof as well as annularly thereof.

While the inner and outer series of balls are provided with an intermediate ball bearing ring 6 therebetween, as above described, the invention is essentially based upon the particular arrangement of the inner and outer series of balls with respect to each other. In particular the inner and outer ball series are so arranged that an imaginary plane A which passes equidistant between a pair of inner ball rows 2 and 3 and normal to the axis of the concentric rings is spaced along the said axis from an imaginary plane B which passes equidistant between a pair of outer ball rows 10 and 11 and normal to the axis of said concentric rings. Otherwise stated, the inner and outer ball series are so arranged that an imaginary common plane C which passes equidistant between a pair of inner ball rows 2 and 3 and equidistant between a pair of outer ball rows 10 and 11 intersects the axis of the concentric rings at an oblique angle.

When the inner and outer ball series are arranged as described above, it will be apparent, according to Figure 3, that any static or dynamic unbalance of a rotary body will be communicated to the shaft 14, which during rotation causes the centrifugal forces developed by the unbalance to act radially against the inner ball series 4 and 5, e. g. through inner ring 1, and to the inner surface 7 of the intermediate ring 6. Since the outer ball series are positioned in axially spaced relation to the inner ball series, the radial centrifugal forces against the inner ball series cause the inner ring 6 to oscillate transversally of the outer ring 12 with the attendant transverse traverse of the outer ball series against the inner surface 13 of the ring 12. The oscillation of the ring 6 is in fact effected in a manner such that the arrangement of the inner and outer ball series provides for a leverage function, whereby the intermediate ring 6 is caused to oscillate transversally of the outer ring 12 and independently thereof.

Consequently, since the oscillation of the intermediate ring 6 is a direct function of the centrifugal forces transmitted by the shaft 14 due to unbalance, it will be apparent that the rotational axis of the rotary body, through the shaft 14, will exactly coincide with the mass center of the rotating body because the said rotational axis is free to shift with the mass center and is not restrained by the middle ring since the middle ring 6 oscillates to permit the rotational axis to shift with the mass center. In view of the oscillation of the ring 6, the unbalanced radial centrifugal forces against the said ring 6 are now directed transversally of the outer ring and are confined to the oscillating intermediate ring 6, whereby the outer ring 12 is maintained substantially free of vibration due to the self-balancing action of intermediate ring 6.

Figure 4 represents the ball bearing assembly above described in mounted position on the shaft 14 of a rotor 15, whereby any static and dynamic unbalance of the said rotor is transmitted to the shaft 14, and whereby any unbalance of the said rotor will cause the rotational axis of the rotor to coincide and shift with the mass center of the rotor during rotation, whereby the oscillation of the ring 6 prevents the transmission of vibration to the outer ring 12 or to the support 16 operatively associated with the said outer ring.

While the structure herein described is schematically illustrated, it will be apparent that various structural modifications thereof are herein contemplated within the scope of the appended claims, since the basic concept and structure of the self-balancing ball bearing assembly is applicable to numerous high speed rotary structures, e. g. gyroscopes, lathes, etc.

What I claim is:

1. An automatically balancing ball bearing assembly comprising in combination inner and outer co-axial annular series of balls, a ball bearing ring between said inner and outer ball series, each of said ball series comprising a plurality of annular ball rows spaced from each other along the common axis of said ball series, said ring having a concave annular inner surface contacting said inner ball series and a substantially cylindrical outer surface having a plurality of annular grooves therein, said outer ball series being seated in said grooves, the outer ball series being spaced from the inner ball series along their common axis.

2. An automatically balancing ball bearing assembly comprising in combination inner and outer co-axial annular series of balls, a ball bearing ring between said inner and outer ball series, each of said ball series comprising a plurality of annular ball rows spaced from each other along the common axis of said ball series, said ring having a concave annular inner surface contacting said inner ball series and a substantially cylindrical outer surface having a plurality of annular grooves therein, said outer ball series being seated in said grooves, the outer ball series being spaced from the inner ball series along their common axis, an outer ball bearing ring having a concave annular inner surface, said outer ball series contacting said concave surface of said outer ring.

3. An automatically balancing ball bearing assembly comprising in combination a substantially cylindrical inner ball bearing mount, a plurality of spaced annular grooves on the outer surface of said mount, said grooves being spaced axially of said mount, a plurality of annular ball rows seated in said grooves, said ball rows comprising an inner ball series, a second ball bearing ring, said second ring having a concave annular inner surface contacting said inner ball series and a substantially cylindrical outer surface, a plurality of spaced annular grooves on the outer surface of said second ring, said grooves being spaced axially of said second ring, a plurality of annular ball rows seated in said grooves on said second ring, said ball rows comprising an outer ball series, a third ball bearing ring having a concave inner surface, said outer ball series contacting the said concave surface of said third ring, the inner ball rows and the outer ball rows being so spaced in relation to each other that an imaginary plane passing equidistant between a pair of inner ball rows is spaced along the common axis of said ball series from an imaginary plane passing equidistant between a pair of outer ball rows, said imaginary planes being normal to said axis.

4. An automatically balancing ball bearing assembly according to claim 3, wherein said concave surfaces are spherical surfaces.

5. An automatically balancing ball bearing assembly according to claim 3, wherein said inner ball bearing mount is a substantially cylindrical inner ring.

6. An automatically balancing ball bearing assembly according to claim 5, wherein said inner ring is mounted on a rotor shaft.

7. An automatically balancing ball bearing assembly comprising in combination inner and outer co-axial annular series of balls, a ball bearing ring between said inner and outer ball series, each of said ball series comprising a plurality of annular ball rows spaced from each other along the common axis of said ball series, said ring having a concave annular inner surface contacting said inner ball series and a substantially cylindrical outer surface having a plurality of annular grooves therein, said outer ball series being seated in said grooves, the outer ball series being spaced from the inner ball series along their common axis, said spacing being such that a common imaginary plane passing equidistant between a pair of ball rows of said inner series and equidistant between a pair of ball rows of said outer series intersects their common axis at an oblique angle.

References Cited in the file of this patent

UNITED STATES PATENTS

| | | |
|---|---|---|
| 561,861 | Briscoe | June 9, 1896 |
| 1,384,002 | Sundhaussen | July 5, 1921 |
| 1,804,600 | Edson | May 12, 1931 |

FOREIGN PATENTS

| | | |
|---|---|---|
| 47,226 | Sweden | Nov. 29, 1913 |